United States Patent
Parachini et al.

(10) Patent No.: US 7,629,800 B2
(45) Date of Patent: Dec. 8, 2009

(54) WATER LEVEL MEASUREMENT SYSTEM

(75) Inventors: Davide Parachini, Cassano Magnago (IT); Paolo Crosta, Gavirate (IT)

(73) Assignee: Whirpool Corporation, Benton Harbor, MI (US)

( * ) Notice: Subject to any disclaimer, the term of this patent is extended or adjusted under 35 U.S.C. 154(b) by 338 days.

(21) Appl. No.: 11/624,251

(22) Filed: Jan. 18, 2007

(65) Prior Publication Data

US 2007/0164751 A1   Jul. 19, 2007

(30) Foreign Application Priority Data

Jan. 19, 2006   (EP) ............................ 06100562

(51) Int. Cl.
*G01F 23/00*   (2006.01)
*G01R 27/08*   (2006.01)

(52) U.S. Cl. ............... 324/691; 73/290 R; 73/304 R
(58) Field of Classification Search ............... 324/691
See application file for complete search history.

(56) References Cited

U.S. PATENT DOCUMENTS

| | | | |
|---|---|---|---|
| 4,092,860 A | 6/1978 | Arts et al. | |
| 4,672,322 A | 6/1987 | Gratteau et al. | |
| 4,683,435 A | 7/1987 | Blades | |
| 4,808,931 A | 2/1989 | Ling | |
| 5,705,747 A * | 1/1998 | Bailey | 73/290 R |
| 5,793,294 A * | 8/1998 | Schepka | 340/616 |
| 6,312,074 B1 * | 11/2001 | Walker | 347/7 |
| 6,810,732 B2 | 11/2004 | Shon | |
| 6,820,483 B1 * | 11/2004 | Beckerman | 73/304 C |
| 7,143,761 B2 * | 12/2006 | Hwang | 126/20 |
| 2002/0116999 A1 * | 8/2002 | Heger | 73/304 C |
| 2007/0079653 A1 * | 4/2007 | Zuleta et al. | 73/304 R |

* cited by examiner

*Primary Examiner*—Timothy J Dole
*Assistant Examiner*—John Zhu
(74) *Attorney, Agent, or Firm*—Clifton G. Green; McGarry Bair P.C.

(57) ABSTRACT

The present invention relates to an apparatus to measure water level in a water reservoir by measuring electrical conductivity between electrodes, including a reference electrode, at least one measuring electrode projecting into the water reservoir, and at least one electronic detection circuit to detect a presence of water based on the conductivity measurement.

15 Claims, 5 Drawing Sheets

WATER LEVEL MEASUREMENT SYSTEM

BACKGROUND OF THE INVENTION

1. Field of the Invention

The present invention relates to an economic water level measurement system based on a conductivity-measuring cell, to be used in a water reservoir of an appliance or any device requiring indication of the water level. The measurement system may be used when the water conductivity in the reservoir varies over a wide range of values. In particular, the water level measurement system is suitable for a steam oven.

2. Description of the Related Art

From U.S. Pat. No. 4,808,931 to Ling, it is known to use a four-electrode open-cell conductivity sensor, which measures the conductivity of ocean water through two pairs of electrodes. The first pair of electrodes is connected to an alternating current (AC) source, inducing an electric field in the area where the conductivity of the fluid is to be measured. The second pair of electrodes is used to sense the electric field generated by the first pair of electrodes. Both pairs of electrodes are built into a plastic support having a symmetric geometry, making the electric field easily predictable. The first pair of electrodes is fed with a 10 kHz AC signal having small amplitude, to prevent the chemical dissociation of the water. Any variation of the magnitude in the water conductivity causes a change in the electric field sensed by the second pair of electrodes. An electronic circuit, based on peak detection technology, and including an operational amplifier having high common mode rejection ratio (CMRR) values, converts the current flowing between the second pair of electrodes into a voltage signal, balancing the noise and polarization effects induced by factors such as the environment or dirt. The same electronic circuit also regulates the magnitude of the current source in order to maintain the RMS value of the voltage drop measurable across the first pair of electrodes. As a result, the current required for maintaining the voltage level is linearly proportional, with a coefficient depending on the geometry of the sensor and the conductivity of the fluid. The coefficient is easy to calculate, because the geometry of the sensor is defined. The amplified voltage signal is then sent to a microcomputer to calculate the water conductivity. The electronic circuit is placed in an insulated housing located close to the electrodes, therefore reducing the effects of electric noise of the surrounding environment. The closeness of the electrodes to the electronic circuit requires short connection wires, causing a voltage phase shift due to the capacitance effects of the wires. However, this effect is small and balanced by the high CMRR of the amplifier. The output of the amplifier can also be transmitted to signal processing equipment, for further processing.

From U.S. Pat. No. 6,810,732 to Shon, it is known to use an apparatus for sensing the water level in a water tub of a washing machine using a conductivity measuring cell provided with two pairs of electrodes, reference and measuring, embedded in the water tub. The conductivity of the water varies according to the type of substances dissolved in the water. The reference electrodes provide a relative reference signal that when coupled with the signal from the measuring electrodes is used to evaluate the level of water present in the water tub.

The measuring electrodes in the water tub are extended to be longer than the reference electrode, and are immersed in water when the tub is filled. The reference electrode is spaced apart from the measuring electrodes and is always immersed in water in the bottom of the tub. Independent from the turbidity of water, its electric conductivity is inversely proportional to the length of an electrode but directly proportional to a contact surface area between the water and the electrode. Thus, when the water tub is filled with water, the contact area increases, thereby proportionally increasing the electrical conductivity of the cell. A fixed direct current (DC) voltage is applied to both electrode pairs, providing a voltage signal correlated with the electrical conductivity of the water cell. This signal is proportional to the voltage measurable across a resistor, in series with the electrodes, when the current flows through them. The two voltage signals from the electrodes are read by a microprocessor. The reference electrode pair provides a reference value for water level measurement, while the measuring electrode pair provides the measured conductivity value, which varies according to the water level. The water level is determined by calculating the difference between the reference and measured values of the conductivity. This technical solution is particularly effective in water level detection in turbid water, where the conductivity changes according the substances dissolved in the water.

The above described device is typically used in washing machines, and its performance is limited when the conductivity of the water is low, as in the case of distilled water. Moreover, this device does not allow complete emptying of the water reservoir and thus requires additional space in the lower side of the reservoir.

Also known in the prior art are water level measuring devices using two electrodes in an open conductivity cell, based on an LC oscillation circuit and peak detection circuit. These devices often fail to precisely measure the conductivity because they are relatively unstable due to temperature variation and long-term wear and tear.

Also known in the art are detection methods that include variation of the frequency of the ac source signal to remove coupled signal interference or to get indication of the scaling on the electrodes.

The prior art also discloses how to detect the presence of water by a measuring cell using water having good conductivity characteristics (washing machine water or seawater, both in the range of hundreds of $\mu S/cm$). In this solution, the electrodes are located near the electronic detecting circuit. A problem arises when the water in the reservoir has low conductivity (lower than 1 $\mu S/cm$, as in case of distillated water), and when the measuring circuit cannot be placed near the electrodes due to an unsuitable surrounding environment. Typically, an unsuitable environment is characterized by high temperature and humidity and by the presence of electrical noise.

An unsuitable environment can be found, for example, in a steam oven provided with a water reservoir for steam generation, which is located close to the hot cavity of the oven. In this environment the temperature and humidity conditions are severe, and the space to position the electronic devices is small, making it difficult to cool the electronics. In such a case, the electronic circuit may be positioned in an insulated and protected environment, such as the control panel area. This area can be additionally cooled with fresh air to better protect the electronic components. In this case, the control panel is probably far from the electrodes that are positioned within the reservoir, and the connection between the electronic circuit and said electrodes requires long wires, rated to sustain the conditions of the surrounding environment.

Moreover, in a steam oven and other consumer appliances, it is possible to face the problem of water having low conductivity. This is typically the case when consumers fill the reservoir using distilled water in an attempt to reduce the scaling due to calcium contained in the water, with the purpose of extending the lifetime of the appliance. In this case, the resistive value of distilled water in the reservoir is comparable with the parasitic capacitance of the wires connecting the electronic circuit to the electrodes. Thus, the resistance of the water and parasitic capacitance of the wiring introduce a large error in the measurement of the conductivity, because the circuit is unable to distinguish between the active and reactive components. More specifically, the capacitance of the cables connecting the measuring circuit to the electrodes can be in the 100 pF range, which at a frequency of 1 kHz, yields a capacitive reactance of 1.5 MΩ. In the same way, the resistance of the water in the reservoir ranges from a few hundred MΩ for distilled water, to KΩ values for water with salts.

Finally, the electrical noise of the environment is an additional parasitic component, causing further degradation of the conductivity-related signal. This undesired effect becomes more important when long cables, more than 30 cm long, are used. To reduce the negative impact of the noise, the art teaches to locate the electronic board close to the electrodes or to use shielded wires, although the shielded wires show a capacitance effect between the two electrodes. These solutions are not always applicable in a hot environment, and they are expensive for large-scale production, as in the case of consumer appliances.

It follows that it is not possible to measure the presence of very low conductivity water, such as distilled water having a conductivity of less than 1 μS/cm, in a reliable and economic way, if a special circuit is not used.

Additionally, it has also been observed that some users fill the water reservoir of appliances using mineral water that presents high conductivity values (more than 1000 μS/cm), for which a standard circuit is suitable.

Thus, there is a need to have consumer appliances that can provide a reliable conductivity measurement over a wide range of water conductivity values, and that is economical for mass production.

SUMMARY OF THE INVENTION

Accordingly, the present invention is directed to a water level measurement system that can provide a reliable conductivity measurement over a wide range of conductivity values.

One embodiment of the invention is an apparatus to measure water level in a water reservoir by measuring electrical conductivity between electrodes, including a reference electrode, at least one measuring electrode projecting into the water reservoir, and at least one electronic detection circuit to detect a presence of water based on the conductivity measurement.

The electronic detection circuit may include an alternating current signal generator, a resistor connected to the alternating current signal and a measuring electrode, an amplifier generating a conductivity related signal, a multiplier, a filter, and a comparator having a threshold voltage that is compared to the conductivity signal. The output signal of the comparator indicates the presence of water in the water reservoir. The filter may reject electrical noise and stray capacitance from signals on the resistor and surrounding circuitry. The electronic circuit may be separated from the electrodes by wires having a length of at least 30 cm.

The reference electrode may be the water reservoir or may be an additional electrode projecting into the water reservoir.

The apparatus may be housed in an appliance, specifically an oven.

The apparatus may have three measuring electrodes projecting into the water reservoir, said measuring electrodes being offset from each other and having different lengths for detecting distinct water levels in the water reservoir.

The apparatus may further include a user interface for displaying the water level based on the conductivity measurement.

Another embodiment of the invention may be an appliance having a water level sensor, including a water reservoir, a reference electrode, three measuring electrodes projecting into the water reservoir and three electronic detection circuits. The electrical conductivity between electrodes is measured by the electronic detection circuits to detect a presence of water at distinct levels in the water reservoir.

The three measuring electrodes may be linearly scaled in their lengths for sensing water at distinct levels in the water reservoir. The sensor may be able to detect water at four distinct levels: empty, low level, medium level, and high level. The measuring electrodes may be provided in an insulated cap, wherein the insulated cap maintains a distance between the electrodes and between the electrodes and inner walls of the water reservoir. The measuring electrodes may be stainless steel, bar-shaped elements.

The electronic circuit may include an alternating current signal generator, a resistor connected to the alternating current signal and a measuring electrode, an amplifier generating a conductivity related signal, a multiplier, a filter, and a comparator having a threshold voltage that is compared to the conductivity signal. The output signal of the comparator indicates the presence of water in the water reservoir.

The output signal may further be used as a feedback signal to control water consumption, steam generation, or filling of the water reservoir.

The invention further includes a method of detecting water level in a water reservoir having a reference electrode and at least one measuring electrode. The method includes the steps of applying an electric current through the measuring electrodes, measuring conductivity of water between electrodes, and determining a water level based on the conductivity measurement.

The step of determining a water level may include processing the conductivity measurement in an electronic circuit having a filter for rejecting noise.

The method may further comprise the step of displaying the water level on a user interface.

BRIEF DESCRIPTION OF THE DRAWINGS

An object of the present invention is therefore to provide a water level measurement system and a method thereof that does not present the drawbacks of the prior art. Other features and advantages of the present invention will become readily apparent to one of skill in the art from the following detailed description when read in light of the accompanying drawings, in which.

DETAILED DESCRIPTION OF THE PREFERRED EMBODIMENTS

Figure 1:
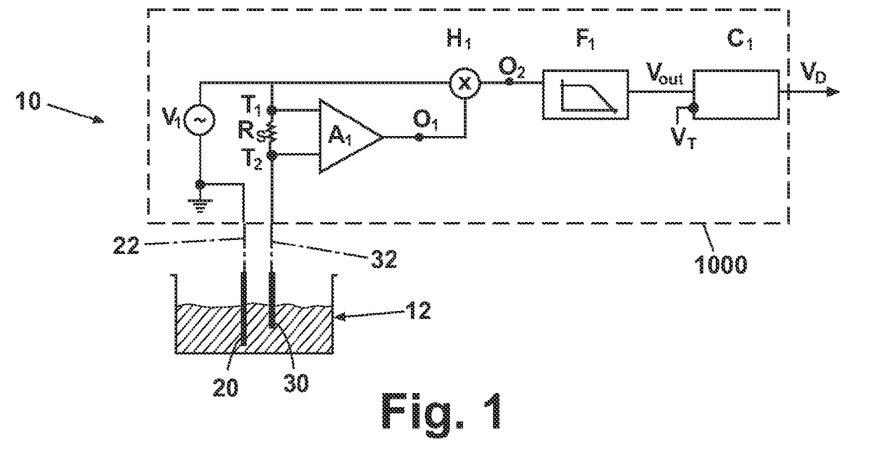
FIG. 1 is a schematic diagram showing the measuring channel, which is a portion of the water level measurement system, according to an embodiment of the invention.

With reference to the drawings, the water level measurement system 1 of the present invention is based upon detection and sensing of water within a water reservoir 12, by measuring electrical conductivity of the water via an electronic synchronous detection circuit 1000. FIG. 1 illustrates an embodiment of a measuring channel 10, showing a portion of the water level measuring system 1, which includes at least two electrodes 20 and 30 located in the water reservoir 12. The electronic synchronous detection circuit 1000, which is a portion of the electronic circuit 100 of the water level measurement system 1 of this invention, may be located remotely from the water reservoir 12 and connected to said electrodes 20 and 30 through cables 22 and 32, which preferably have a length of about 50 cm.

The electronic circuit 1000, as shown in FIG. 1, may include an alternating current (AC) sinusoidal excitation source signal $V_1$, preferably having frequency between 500 Hz and 10 kHz, which is high enough to avoid power line disturbances and low enough to avoid radio frequency (RF) emission and switching apparatus disturbances. $V_1$, which preferably has a peak amplitude less than 200 mV to prevent the chemical dissociation of the substances dissolved in the water, supplies at least two electrodes 20 and 30, which project into the water reservoir 12. The electrodes 20 and 30 may be linear and made of a material that is electrochemically neutral, such as stainless steel. There may be any number of electrodes provided in the water reservoir 12. $R_S$ is a resistor connected in series with electrodes 20 and 30, having electric current I flowing through the water in the water reservoir 12 of the measuring channel 10 and thereby through $R_S$.

The current I is proportional to the conductivity of the water present between the electrodes 20 and 30 projecting into the reservoir 12. The current I flowing through $R_S$ causes a measurable voltage drop between the terminals T1 and T2 of $R_S$, which is proportional to the water conductivity.

$A_1$ is a differential amplifier connected between terminals T1, T2 of said resistor $R_S$ that de-couples the signal from the electrodes and amplifies said voltage drop, resulting in an output signal value, $O_1$.

Figure 3:
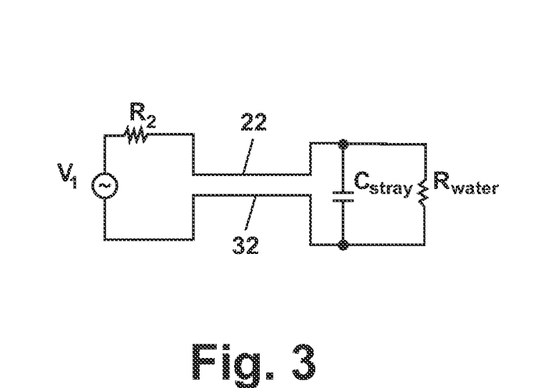
FIG. 3 shows a model of an excitation circuit used with the measuring channel shown in FIG. 1.

As further depicted in FIG. 3, channel 10 can be ideally modeled as a generator $V_1$ that is in series with $R_S$, and that supplies a parallel combination of $R_{WATER}$, which is the resistive component of the water conductivity, and $C_{STRAY}$, which is the reactive impedance of the wires 22 and 32, which connect the electrodes 20 and 30 to the electronic synchronous detection circuit 1000. Due to this configuration, the output signal $O_1$ has a component in-phase with $V_1$, containing the conductivity-related signal (linked to $R_{WATER}$), and a 90° phase shifted component that is linked with the parasitic capacitance of the connecting wires ($C_{STRAY}$). The output signal $O_1$ is also affected by electrical noise in the environment.

An improvement of the present invention over the prior art is to separate and eliminate the conductivity-related signal from the reactive component. This is possible because the electronic circuit 1000, as shown in FIG. 2B, includes a synchronous multiplication operation $M_1$ provided between the excitation source signal $V_1$ and the output signal $O_1$. The multiplication operation M1 results in an output signal $O_2$ which has a null average over the period for the phased out components, while preserving the conductivity related signal that is in phase with the source signal $V_1$. To increase the Signal to Noise Ratio (SNR) of the measuring channel 10, a low pass filter $F_1$ may be provided after the multiplication operation M1. The low pass filter F1 preferably has a cut-off frequency that balances the trade-off between the necessary SNR and the response time of the filter. The output signal $V_{OUT}$ of the filter $F_1$ is thus proportional only to the resistive component of the water conductivity.

Next, $V_{OUT}$ is compared in a comparator $C_1$, having a fixed threshold voltage value $V_T$, which is set based on the electrodes and water reservoir 12. The comparator compares $V_{OUT}$ to $V_T$ to determine if water is present between the electrodes 20 and 30. The output $V_D$ of the comparator $C_1$ can be "0" to indicate that $V_{OUT}$ is below the threshold $V_T$, or "1" when the signal is equal to or above said threshold $V_T$.

For example, when the reservoir 12 is empty, the electrodes 20 and 30 do not have electric current I flowing through them, so the electronic synchronous detection circuit 1000 amplifies and filters a null signal having only parasitic components. The $V_{OUT}$ signal has a level below the discriminating voltage threshold $V_T$, and the resulting output $V_D$ is equal to "0" to indicate that no water has been detected in the channel 10.

Similarly, when the reservoir 12 is at least partially filled with water, the electrodes 20 and 30 will have an electric current I flowing through said electrodes 20 and 30 and $R_S$. The electronic synchronous detection circuit 1000 amplifies and filters an input signal having a parasitic component superimposed with a conductivity related signal, providing an output signal $V_{OUT}$ that is filtered from any parasitic component. In this case, $V_{OUT}$ is above the discriminating voltage threshold $V_T$, resulting in an output signal $V_D$ equal to "1", indicating that water has been detected in the measuring channel 10.

Figure 2A:
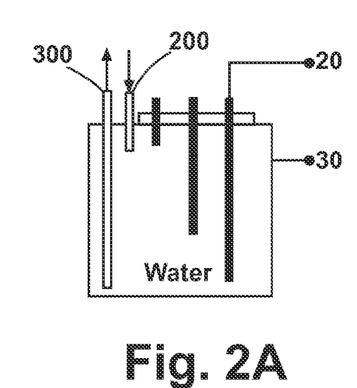
FIG. 2A is schematic view of the projection of the electrodes into the water reservoir.
Figure 2B:
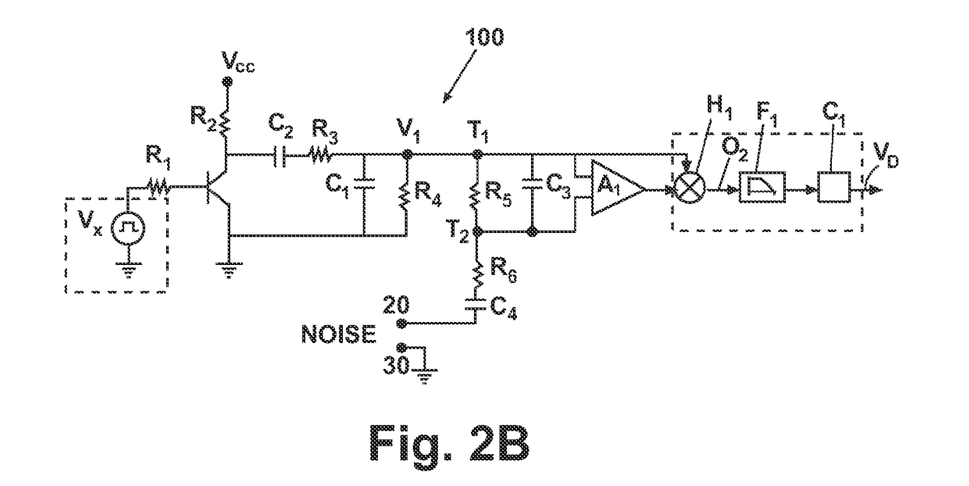
FIG. 2B is a block diagram of a synchronous detector circuit, implementing part of the electronic circuit of the measuring channel shown in FIG. 1.

In FIG. 2A an embodiment of the water reservoir 12 is provided having two electrodes 20 and 30, in which electrode 20 is the metallic chassis of the water reservoir 12. In a second embodiment, electrode 20 is located in the water reservoir 12 as a separate electrode. Electrode 30 may be a bar shaped, linear element.

An example of an implementation of the electronic circuit 1000 is shown in FIG. 2B. In this circuit embodiment, $V_X$ is a square wave source signal generated by a microprocessor, preferably having a frequency of approximately 1 kHz, a magnitude of approximately 5 V and a duty cycle of approximately 50%. The transistor Q1 and accompanying resistors and capacitors scale $V_X$ to obtain a signal preferably having a peak amplitude of approximately 200 mV with smoothed edges, shown as $V_1$ in FIG. 2B. $V_1$ is the input to the electrodes 20 and 30 as well as to the resistor $R_S$. C3 is an additional capacitor that filters the high frequency noise coming from the surrounding environment. As shown, electrode 30 may be connected to ground, but this is not mandatory. The current I flowing through the electrodes 20 and 30 generates a proportional voltage drop on $R_S$, between its terminals T1 and T2, which is then de-coupled and amplified by $A_1$. R6 aids in protecting the circuit from over voltages and C4 may be used for AC decoupling. The output $O_1$ of the amplifier $A_1$ is then multiplied with the AC source signal $V_1$. The multiplication of $V_1$ with $O_1$ may be implemented by the microprocessor used to generate the $V_X$ source signal.

The digital multiplication may be implemented by sampling the voltage signal $O_1$ in synchronized timing with the source signal $V_X$. The sampling is best shown in FIG. 8A, at the times A and B, as shown on the signal $V_X$. The voltage is calculated from the difference $O_1(A)-O_1(B)$ of the signal $O_1$ sampled at A and B of the signal $V_X$. The resulting output data $O_2$ may still be affected by electrical noise of the environment and thus may be filtered by a low pass filter $F_1$. The filter $F_1$ may be digitally implemented and may have a response time of approximately 250 ms. One method to accomplish this is by averaging two consecutive output signals $O_2$, sampled approximately every 250 ms. Digital filtering can also be implemented using other equivalent methods. The output signal of the filter is then compared with $V_T$ in order to determine if water is present in the water reservoir 12. The output $V_D$, of the comparison operation is equal to "0" when no water is detected in the water reservoir 12, or is equal to "1" when water has been detected.

Figure 8:
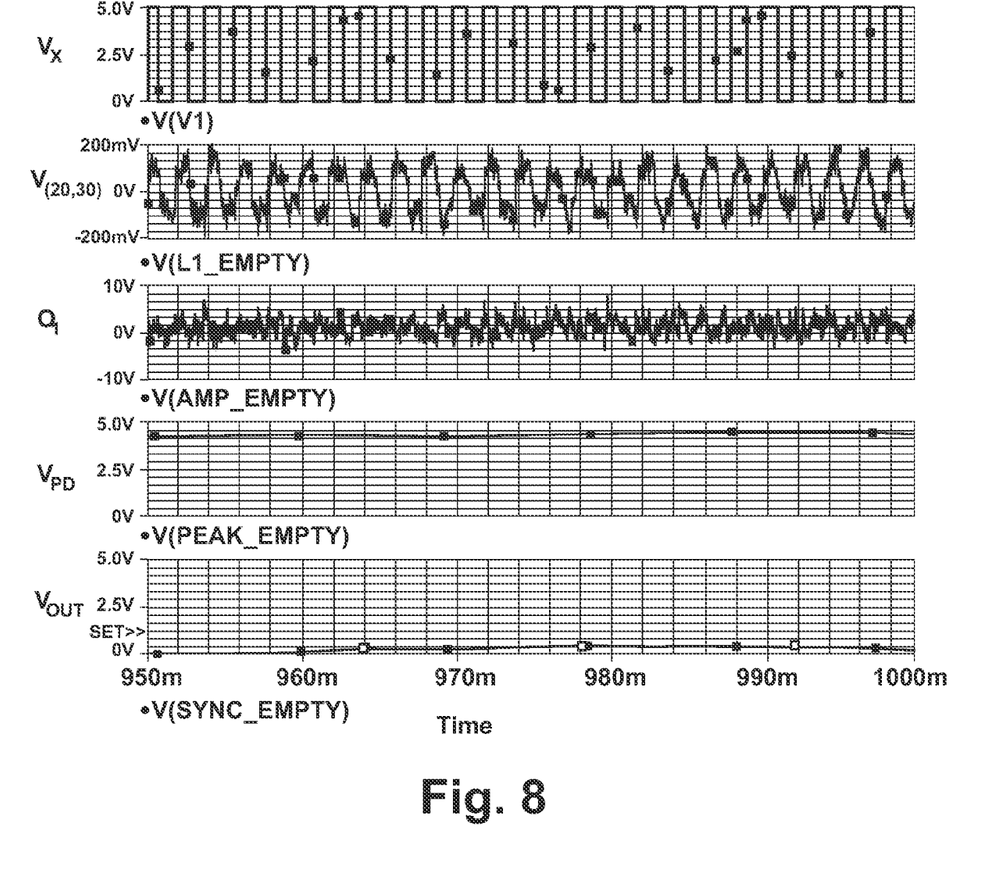
FIG. 8 shows plots of the electronic output signals according to the invention when the water reservoir is empty, compared with the outputs obtained by using the peak detection circuit known in the art.
Figure 8A:
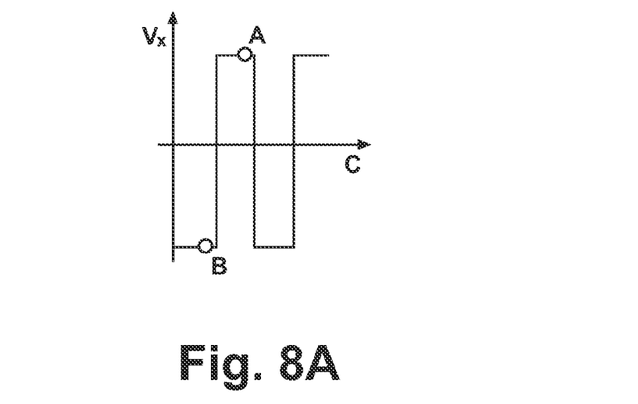
FIG. 8A is a detail of the $V_X$ signal plotted in FIGS. 8 and 9, showing how the signal is sampled.

FIG. 8 shows the circuit signals when the water reservoir 12 is empty. In the figure, $V_X$ is the source signal generated by the microprocessor, V(20_30) is the signal between electrodes 20 and 30, and $O_1$ is the output signal from the amplifier $A_1$. $V_{PD}$ and $V_{OUT}$ are the low pass filtered outputs obtained using two detection methods. $V_{PD}$ is obtained using a peak detector circuit, as disclosed in the prior art, while $V_{OUT}$ is the output of $F_1$ in the synchronous detector circuit 1000, as previously described.

Figure 9:
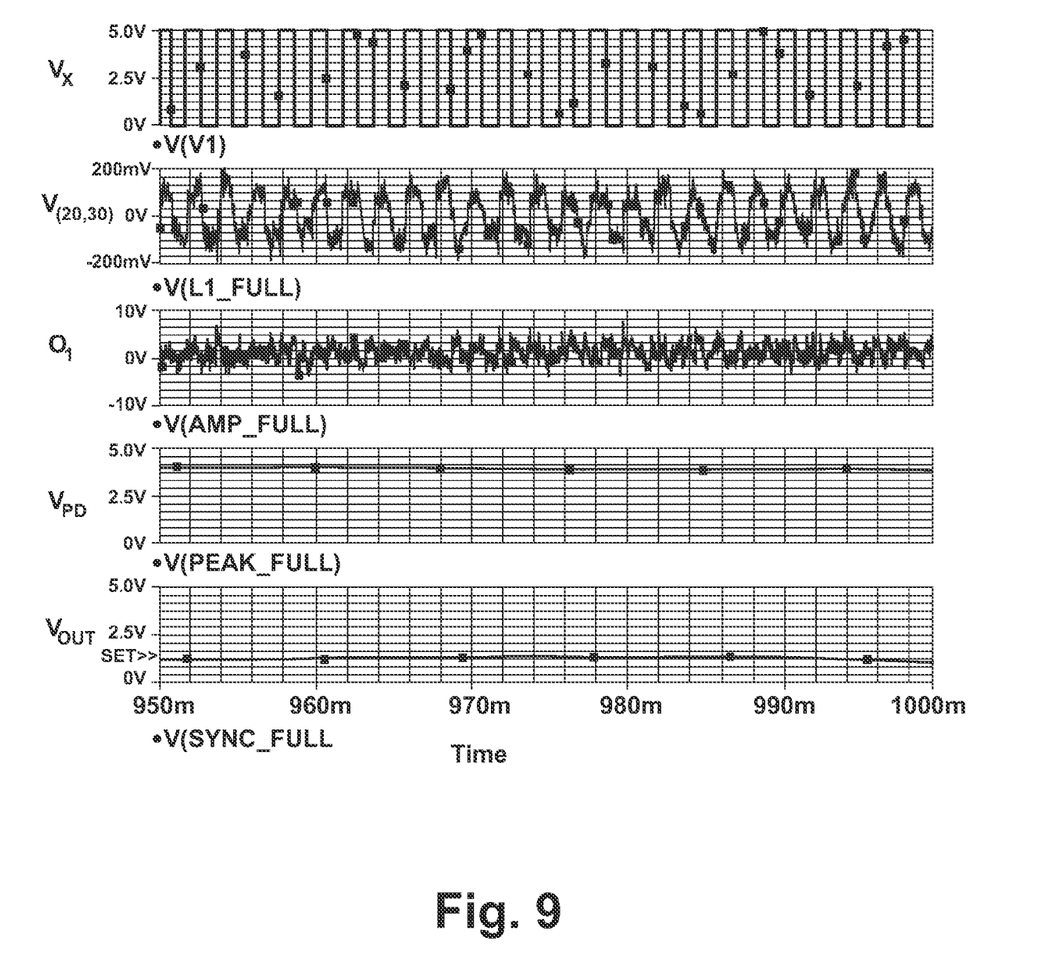
FIG. 9 shows plots of the electronic output signals according to the invention when the water reservoir is full, compared with the outputs obtained by using the peak detection circuit known in the art.

Similarly, FIG. 9 shows the same previously described signals when the electrodes 20 and 30 are at least partially submerged in distilled water. The differences between the signals shown in FIGS. 8 and 9 will be further described in the following sections.

Comparing the $O_1$ signal of FIG. 8, obtained in the case of an empty water reservoir 12, with the $O_1$ signal of FIG. 9, related to a water reservoir 12 at least partially filled with distilled water, the $O_1$ signals are similar. Thus, it appears that the effects of the stray capacitance $C_{STRAY}$ and of the noise N on the magnitude of the signal are comparable with the water conductivity signal.

When the water reservoir 12 is empty, the output $V_{PD}$ of the peak detector circuit is approximately 4.0V, while the output of the synchronous detection circuit 1000, $V_{OUT}$, is approximately 0.7V. When the water reservoir 12 is at least partially filled with distilled water, the output of the peak detector circuit $V_{PD}$, is also approximately 4.0V, while the output $V_{OUT}$ is approximately 1.2V. The output signals $V_{PD}$ have approximately the same value in both cases. Thus, due to parasitic effects, the water detection device based on the peak detector circuit (output of $V_{PD}$) results in an erroneous indication of the presence of water in the water reservoir 12. Furthermore, when using a peak detector circuit with distilled water, it becomes difficult to set a reliable threshold value $V_T$, which is used to discriminate between the presence or absence of water in the water reservoir 12.

On the other hand, the synchronous detection circuit 1000 is better able to filter the parasitic effects, and thus provides a correct interpretation of the presence of water in the water reservoir 12. Additionally, the signal is consistent, so the threshold voltage $V_T$ may be set to a value of 0.7V. Thus, the synchronous detection circuit 1000 improves the likelihood of providing a reliable measurement. The results, as shown in FIG. 9, represents a worst case scenario, using distilled water, which has a low conductivity. Thus, when the conductivity of the water is higher, the output of the synchronous detection circuit 1000 $V_{OUT}$ may be an even stronger signal.

With reference to FIGS. 4-7, another embodiment of the present invention is shown. To detect various water levels in the water reservoir 12, the water level measurement system 1 of the present invention may comprise four electrodes 20, 30, 40 and 50, and a user interface that displays the water level.

The water reservoir 12, which may be built in various materials, such as plastic or metal, may be provided with an inlet 200 to feed water into the reservoir 12, and an outlet 300 to remove water from the reservoir.

In the embodiment illustrated in FIGS. 4-7, the water reservoir 12 is made with conductive material, such as stainless steel and is used as reference electrode 20. Alternatively, a separate electrode may be placed in the water reservoir 12 as the reference electrode 20. Three measuring electrodes 30, 40 and 50, which may be stainless steel bars having different lengths, are provided. Preferably, the measuring electrodes 30, 40 and 50 project vertically into the water reservoir 12 to be covered by water when the water reservoir 12 is at least partially full. These electrodes 30, 40 and 50 may be held in place by an insulated cap 60 that maintains the distances and insulation between the electrodes and additionally between the electrodes and the inner walls of the water reservoir 12. The construction of the electrodes 30, 40 and 50 is preferably made to allow vertical insertion of their assembly into the water reservoir 12, also facilitating their extraction for maintenance operations.

In an alternative embodiment shown in FIG. 4A, the water reservoir 12 may be made of a non-conductive material such as plastic and an additional bar shaped electrode 20 is placed into the water reservoir 12 as a reference electrode. The reference electrode 20 preferably has its extremity 20a close to the bottom side of the water reservoir 12.

An alternative equivalent embodiment presents the electrodes having a horizontal disposition into the reservoir. While the preferred embodiment of the present invention shows the above stated configurations, it can be readily understood that the number of electrodes and geometry of electrodes could be changed without altering the function of the invention. For example, two measuring electrodes could be provided and still achieve the desired result.

In the preferred embodiment, the height of the water reservoir 12 is partitioned into a discrete number of levels by three linear shaped electrodes 30, 40 and 50. The electrodes 30, 40 and 50 may be linearly scaled in their lengths from the minimum to the maximum height of the water reservoir 12. Consequently, the water level is mapped as a mathematical discrete step function of the height of the water reservoir 12, varying from empty to the maximum water level, thus allowing for discrimination between four different reservoir levels, linearly distributed and defined as: "Empty", "Low", "Medium", and "Full". Thus, the resolution of the measurement of the water level depends on the number of electrodes provided in the water reservoir 12. In other words, the shape of the electrodes and their disposition in the water reservoir 12 influences the resolution of the water level measurement.

To determine the water level in the water reservoir 12, it is necessary to establish a measuring strategy using a proper pair of electrodes. For example, in the preferred embodiment the measurement is taken between the reference electrode 20 and each one of the variable measuring electrodes 30, 40 and 50, according to the level partition created by the disposition of the electrodes in the reservoir. Electrodes 20, 30, 40 and 50, are connected by wires 22, 32, 42 and 52 to the electronic circuit 100, which may be located remotely from said electrodes. The electronic circuit 100 is preferably located at least 30 cm from the electrodes 20, 30, 40 and 50. Circuit 100 accordingly includes three detection circuits, hereafter named High level detector (HLD), Medium level detector (MLD), and Low level detector (LLD), having the same structure of the previously described electronic synchronous detection circuit 1000. The number of detection circuits depends on the number of measuring electrodes provided within the water reservoir 12. Each of said detection circuits HLD, MLD and LLD has one side connected to the reference electrode 20, and the other side connected to one of the measuring electrodes 30, 40 and 50. In particular, LLD is connected to electrodes 20 and 30; MLD is connected to electrodes 20 and 40; and HLD is connected to electrodes 20 and 50. The reference electrode 20 is also connected to ground in order to increase the immunity to electrical noise.

In an alternative embodiment of the invention, the measurement of the conductivity can be accomplished using a different connection scheme for the electrodes, according to a different measuring strategy. For instance, the measurement can be made using two adjacent electrodes and determining the presence of the water between them. In this case, the connection scheme of the electrodes in the measuring channel does not include a reference electrode 20 and does not require a ground connection.

As already described for the channel 10, each of the detection circuits provides an output that can be "0" when water is not detected in between the electrodes, or "1" when water is detected.

Figure 4:
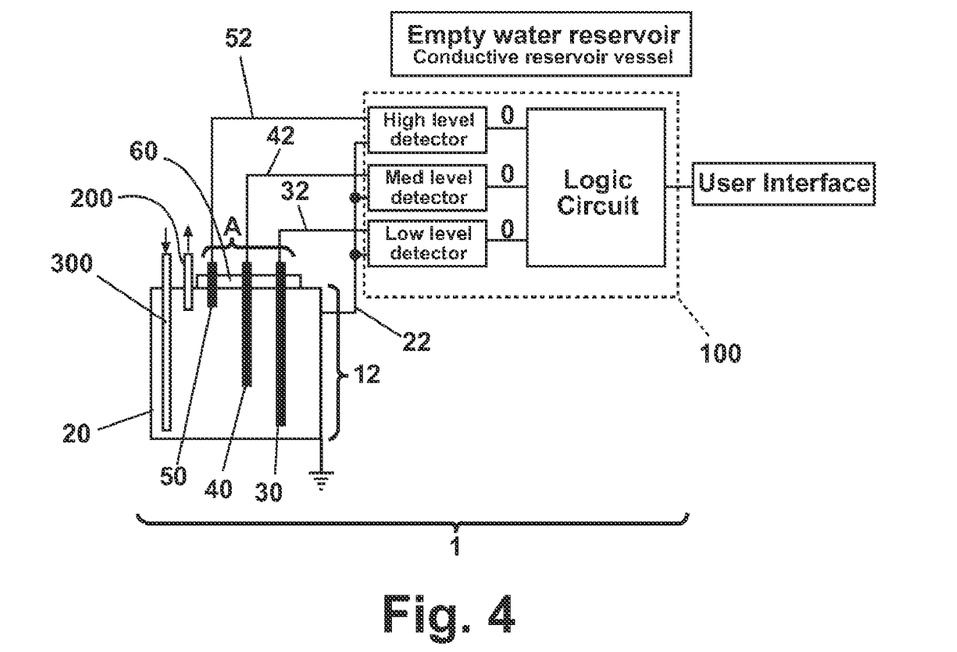
FIG. 4 is a schematic representation of a water level measurement system, according to an embodiment of the invention when the water reservoir is empty.

As illustrated in FIG. 4, when the water reservoir 12 is empty, each detector circuit provides an output of "0". A logic circuit processes the three outputs $V_{Hld}$, $V_{Mld}$, $V_{Lld}$ of the detection circuits HLD, MLD, LLD, respectively, providing an output signal of the water level to the user interface. In this case, the output signal indicates that the water reservoir 12 is empty. The output signal may also be used as feedback signal to the appliance control to be used by the functions linked to the water consumption, for example safety routines, steam generation function or moisture generation function.

Figure 5:
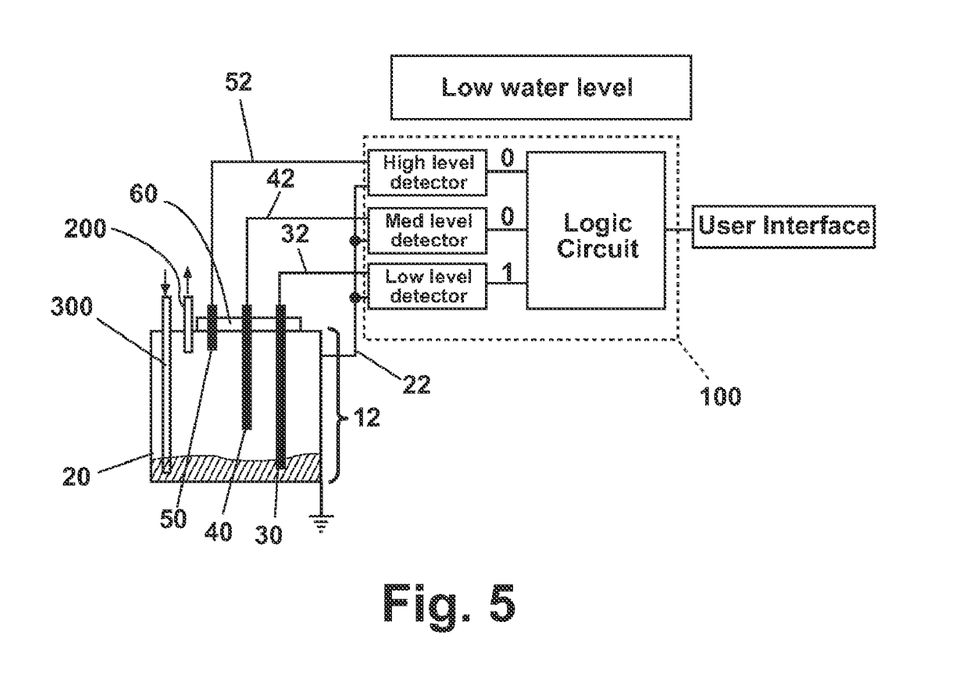
FIG. 5 is a schematic representation of a water level measurement system, according to an embodiment of the invention when the water reservoir is filled at a low level.

FIG. 5 illustrates the case when the water level in the water reservoir 12 is low. In this condition, the detection circuit LLD, provides an output $V_{Lld}$ of "1", while the detectors HLD and MLD provide an output $V_{Hld}$, $V_{Mld}$ of "0". The logic circuit computes an output signal and indicates on the user interface that the water level in the water reservoir 12 is equal to low.

Figure 6:
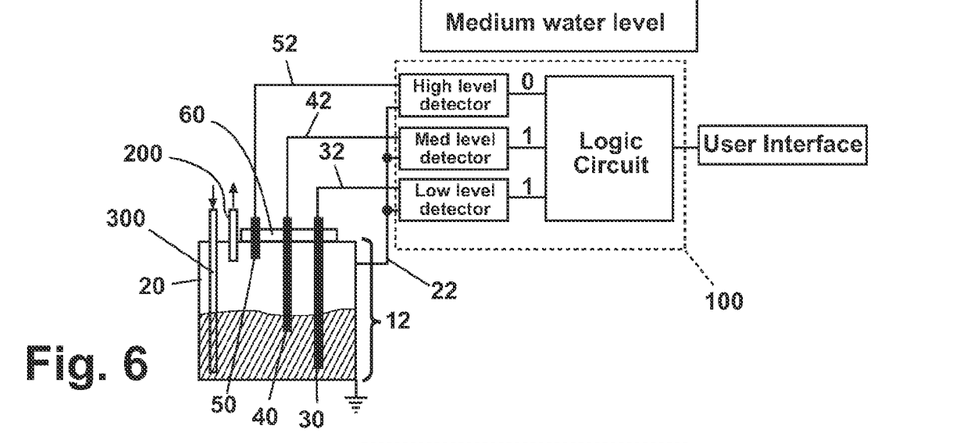
FIG. 6 is a schematic representation of a water level measurement system, according to an embodiment of the invention when the water reservoir is filled at a medium level.
Figure 6A:
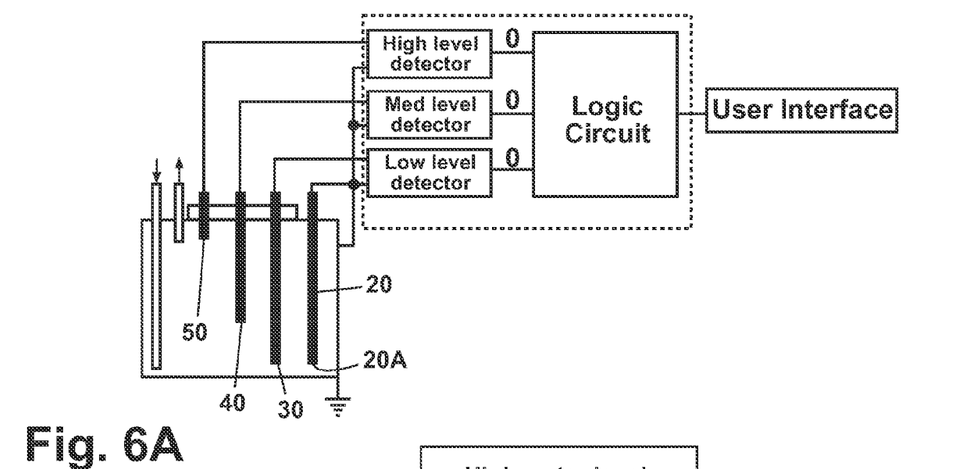
FIG. 6A shows a different disposition of the electrodes in the water reservoir when the water reservoir in not used as a reference electrode connected to ground.

FIG. 6 illustrates the case when the water level in the water reservoir 12 has a medium level. In this condition, the two detectors MLD and LLD provide an output value $V_{Mld}$, $V_{Lld}$ of "1", while HLD has output $V_{Hld}$ of "0". The logic circuit processes these signals, providing an output signal equal to Medium, which is then displayed on the user interface, indicating that the water reservoir 12 is filled at a medium level.

Figure 7:
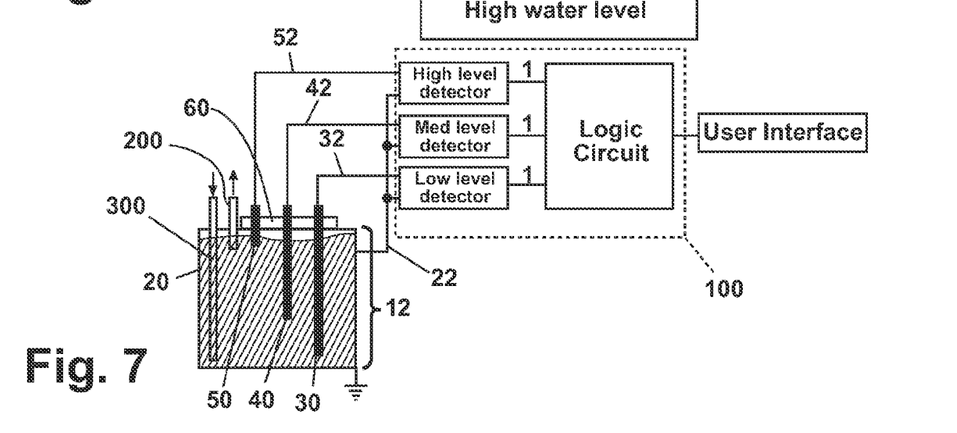
FIG. 7 is a schematic representation of a water level measurement system, according to an embodiment of the invention when the water reservoir is filled at a high level.

Finally, according to FIG. 7, when the water reservoir 12 is full, each detecting circuits LLD, MLD and HLD sense the presence of water providing an output $V_{Hld}$, $V_{Mld}$, $V_{Lld}$ value of "1". The logic circuit processes these signals, providing an output signal equal to Full which is displayed on the user interface, indicating that the water reservoir 12 is full.

The use of the detector circuits LLD, MLD and HLD allows for measuring of the resistive parts of the measuring channel, while rejecting the stray capacitance, and having a narrow bandwidth, increasing the likelihood of good noise rejection. For this reason, longer wires can be used to connect the electrodes to the electronic circuit 100 and consequently the circuit 100 does not need to be located close to the electrodes.

According to the described embodiments of the invention, the water level measurement system 1 having three detection circuits HLD, MLD and LLD, has the capability to detect water level over a wide range of conductivity values. For example, the water level may vary from the very low values of the distilled water (less than 1 µS/cm), up to the high values of saline water (more than 1000 µS/cm). Thus, the solution is versatile, even when noise disturbances are present. The same apparatus and method is applicable for other types of conductive fluids.

While the present invention has been described with reference to the above described embodiments, those of skill in the art will recognize that changes may be made thereto without departing from the scope of the invention as set forth in the appended claims.

What is claimed is:

1. An apparatus to measure water level in a water reservoir by measuring electrical conductivity between electrodes comprising:
    a reference electrode;
    at least one measuring electrode projecting into the water reservoir;
    at least one electronic detection circuit to calculate the water level based on the conductivity measurement, wherein the electronic circuit comprises:
        an alternating current signal generator;
        a resistor connected to the alternating current signal and the at least one measuring electrode;
        an amplifier generating a conductivity related signal;
        a multiplier;
        a filter; and
        a comparator having a threshold voltage that is compared to the conductivity related signal,
        wherein the output signal of the comparator is used to calculate the water level in the water reservoir.

2. The apparatus of claim 1, wherein the filter rejects electrical noise and stray capacitance from signals on the resistor and surrounding circuitry.

3. The apparatus of claim 1, wherein the electronic circuit is separated from the electrodes by wires having a length of at least 30 cm.

4. The apparatus of claim 1, wherein the reference electrode comprises at least one of the following: the water reservoir and an additional electrode projecting into the water reservoir.

5. The apparatus of claim 1, wherein the apparatus is housed in an appliance.

6. The apparatus of claim 5, wherein the appliance is an oven.

7. The apparatus of claim 1, wherein three measuring electrodes project into the water reservoir, said measuring electrodes being offset from each other and having different lengths for detecting distinct water levels in the water reservoir.

8. The apparatus of claim 1, further comprising a user interface for displaying the water level.

9. An appliance having a water level sensor comprising:
    a water reservoir;
    a reference electrode;
    three measuring electrodes projecting into the water reservoir; and
    three electronic detection circuits, wherein electrical conductivity between electrodes is measured by the electronic detection circuits to calculate the water level in the water reservoir;

wherein at least one of the three electronic circuits comprises:
- an alternating current signal generator;
- a resistor connected to the alternating current signal and a measuring electrode;
- an amplifier generating a conductivity related signal;
- a multiplier;
- a filter; and
- a comparator having a threshold voltage that is compared to the conductivity related signal,
- wherein the output signal of the comparator is used to calculate the water level in the water reservoir.

10. The water level sensor of claim 9, wherein the three measuring electrodes are linearly scaled in their lengths for sensing water at distinct levels in the water reservoir.

11. The water level sensor of claim 10, wherein the sensor is able to detect water at four distinct levels in the water reservoir: empty, low level, medium level, and high level.

12. The water level sensor of claim 10, wherein the three measuring electrodes are provided in an insulated cap, wherein the insulated cap maintains a distance between electrodes and between the electrodes and inner walls of the water reservoir.

13. The water level sensor of claim 10, wherein the three measuring electrodes are stainless steel, bar-shaped elements.

14. The water level sensor of claim 9, wherein the output signal is further used as a feedback signal to control at least one of the following: water consumption, steam generation, and filling of the water reservoir.

15. The water level sensor of claim 11, further comprising a user interface for displaying the water level in the water reservoir.

* * * * *